United States Patent [19]

Hudson

[11] 4,141,473
[45] Feb. 27, 1979

[54] SPOUT COVER ASSEMBLY

[75] Inventor: Barry L. Hudson, Lower Templestowe, Australia

[73] Assignee: General Electric Company, Bridgeport, Conn.

[21] Appl. No.: 830,429

[22] Filed: Sep. 6, 1977

[51] Int. Cl.² .............................................. A47G 19/14
[52] U.S. Cl. .................................... 222/473; 222/474; 220/263; 220/264; 220/318
[58] Field of Search ............... 222/465, 469, 470, 472, 222/473, 474, 475, 556; 220/281, 282, 263, 264, 317, 318

[56] References Cited

U.S. PATENT DOCUMENTS

| | | | |
|---|---|---|---|
| 2,620,948 | 12/1972 | Ziskin et al. | 222/473 |
| 2,696,332 | 12/1954 | Felver | 222/474 |
| 3,212,686 | 10/1965 | Pierro et al. | 222/472 |

Primary Examiner—Stanley H. Tollberg
Assistant Examiner—H. Grant Skaggs

[57] ABSTRACT

The spout cover assembly for a container, for example a tea kettle, is formed by a spout cover flap and an operating lever formed integrally from plastics material hinged together by an area of reduced thickness. The operating lever is mounted in the handle of the kettle and the cover flap is hingedly connected with the kettle thereby forming a fulcrum for the operation of the cover flap by the lever.

8 Claims, 4 Drawing Figures

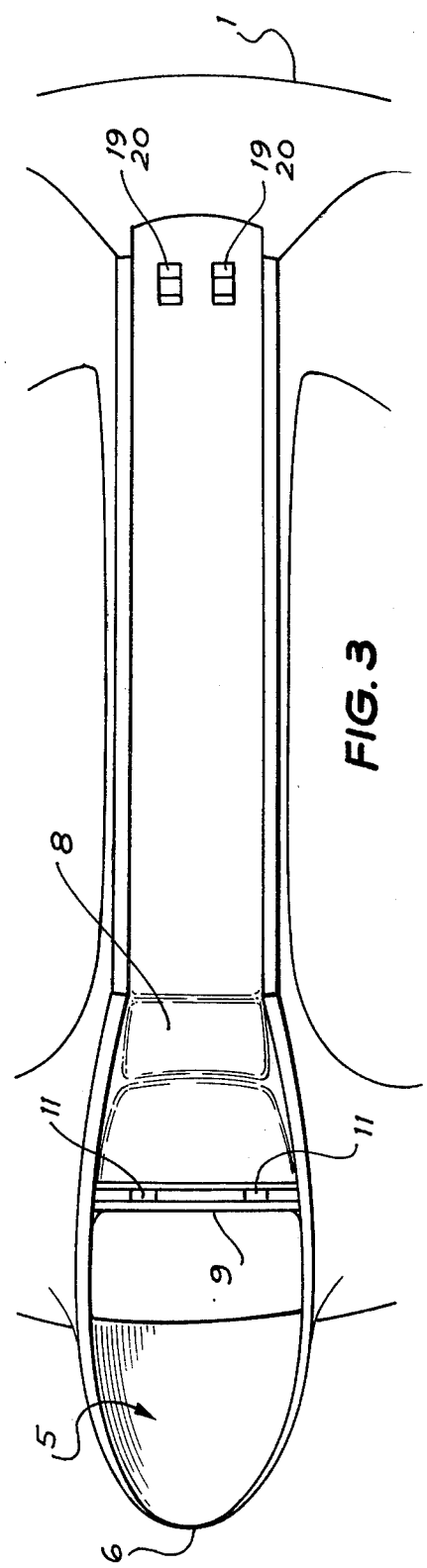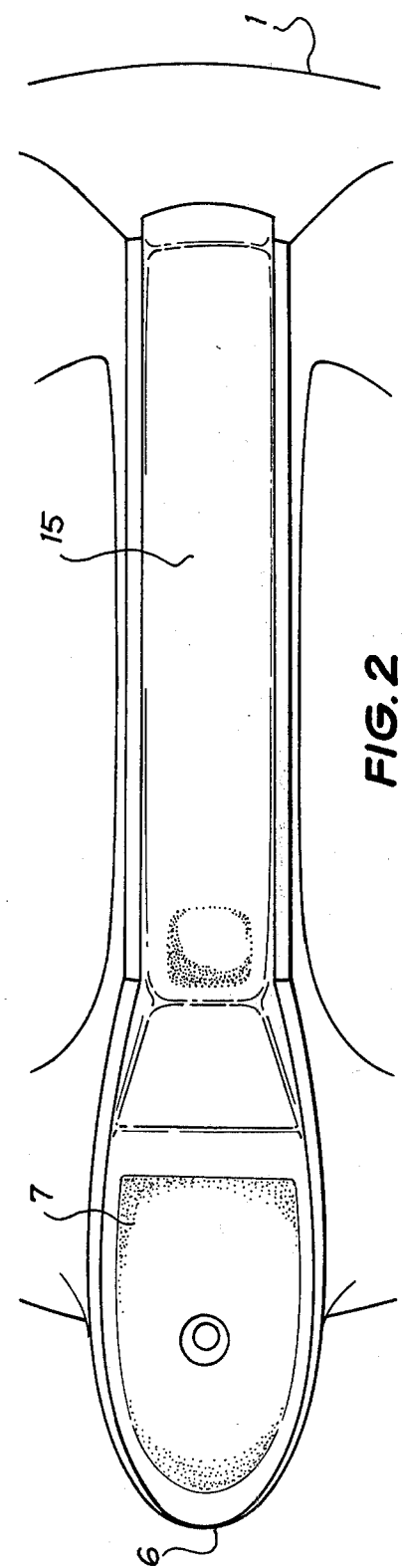

SPOUT COVER ASSEMBLY

The present invention relates to a spout cover assembly for the pouring spout of a container having a handle. The invention particularly relates to domestic containers such as water kettles but is not restricted thereto.

In many containers such as decanters, water jugs, water kettles, and the like it is desirable that the pouring spout of such containers be covered whilst liquid is not actually being poured from the container. This may be desirable purely for aesthetic reasons or to prevent spoiling or contamination of the contents of the container caused by exposure to atmosphere and air-borne dust particles in particular. In addition it may be desirable in the case of a water kettle, for example, to mount a whistle on the spout cover so that the user of the kettle knows when the water in the kettle has boiled.

In order to meet the foregoing requirements there is disclosed, according to the present invention, a manually operable spout cover assembly for the pouring spout of a container having a handle positioned above said container, said assembly comprising a cover flap shaped substantially to correspond with said spout opening and hinge means connecting said cover flap with said container to form a fulcrum for said cover flap to permit movement of said flap between a spout covering position and a spout pouring position; a handle lever pivotally mounted with one end on said handle, the other end of said lever being hingedly connected to one end of said cover flap, said lever and cover flap being integrally formed from plastics material; and resilient means interposed between said handle and said lever to urge said other end of said lever away from said handle to move said cover flap into said spout covering position.

One embodiment of the invention will now be described with reference to the drawings in which:

FIG. 2 shows a top view of the same kettle.

FIG. 3 is a top view of the kettle with the spout cover removed.

Figure 1:
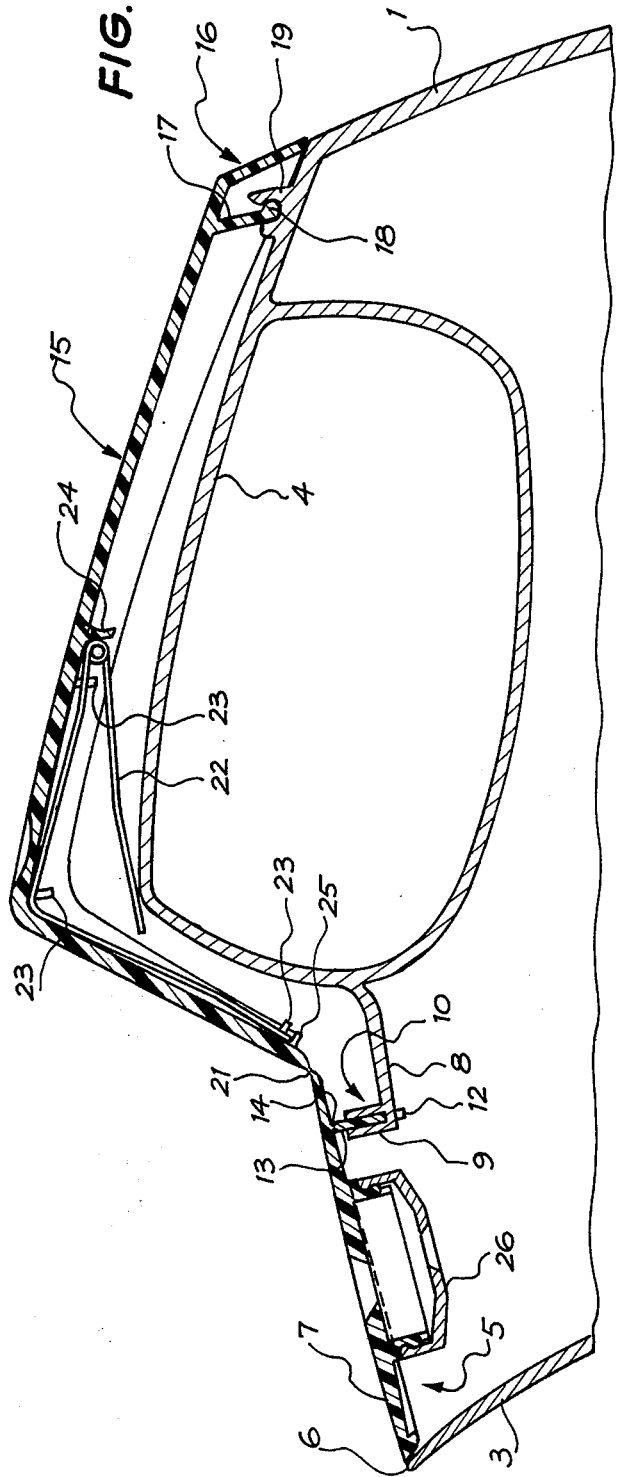
FIG. 1 is a sectional view of the top part of a water kettle with a spout cover assembly according to the invention.
Figure 4:
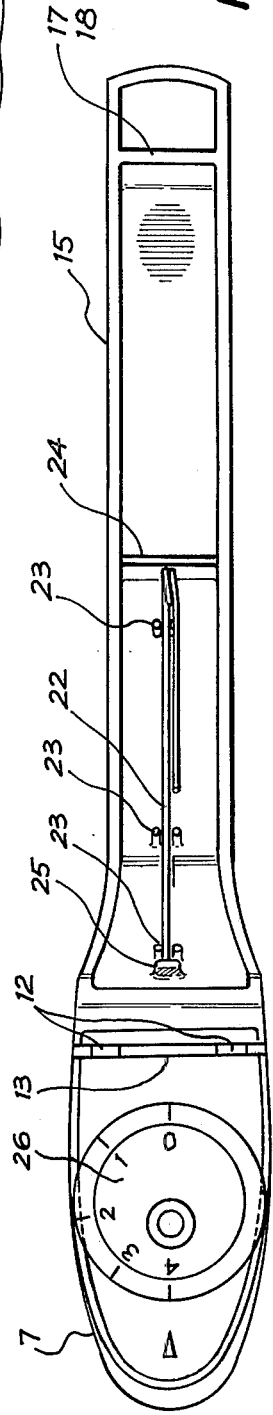
FIG. 4 shows an inside view of the spout cover assembly.

Referring to FIG. 1 there is shown the top part of a water kettle 1 comprising a circular base (not shown). A pouring spout 3 is the only opening in the kettle 1 and the kettle is filled with water through the spout and hot water is poured from the kettle via the spout 3. The kettle has a handle 4 of substantially U-shaped cross section positioned above and immediately behind the spout so as to enable the handle 4 to be grasped with one hand in order to tilt the kettle and pour the water therefrom via the spout.

The spout 3 has a tapered configuration in which the spout opening 5 is broadest closely adjacent to the handle and tapers towards a narrow pouring lip 6 as the spout extends away from the handle 4 and kettle 1. A cover flap 7 shaped to correspond with the spout opening is hingedly mounted on the kettle between the handle and the broadest portion of the spout opening 5. From the front end of the handle 4 there extends towards the pouring spout opening 5 a baffle 8 provided with an upstanding grooved ridge 9 at its free end closest to the spout opening 5. The grooved ridge 9 runs transversely across the broadest end of the spout opening 5 to form a support for the hinged cover flap 7 and prevents steam from escaping through the spout adjacent handle 4. The grooved ridge 9 has two slots 11 (see FIG. 3) to receive with a tight fit lugs 12 of a ledge 13 which extends transversely on the broadest end of the cover flap 7. The hinge connection 10 between the cover flap 7 and the ledge 13 is achieved by a groove 14 running transversely across the end of the ledge 13 adjacent to the cover flap 7 thereby providing a thin flexible piece of plastics material.

The axis of rotation of the cover flap 7 is transverse to the normal direction of pouring and, as will be described hereinafter, this enables the cover flap 7 to be moved between a spout position in which the cover flap lies over the spout opening 5, and a raised spout uncovering pouring position in which the narrower tapered end of the cover flap 7 is raised above the spout 2 to permit water to be poured out of the kettle.

An L-shaped handle lever 15 of substantially inverted U-shaped cross-section is pivotally mounted in the top of the handle 4 at the end of the handle furthest from the pouring spout 3 by a pivot connection 16. Said connection consists of a partition 17 extending between the two walls of the handle lever 15 adjacent the rear end thereof. The partition 17 has a head 18 which engages a pair of "U" shaped lugs 19 with recesses 20 to receive the bead 18. The handle lever 15 which lies above the handle 4 extends down the front of the handle 4 downwards to the cover flap 7. The handle lever 15 is hinged to the broad end of the cover flap 7 behind the ledge 13.

The axis of the hinge lies transverse to the pouring spout 3 and therefore parallel to the axis of rotation of the hinged cover flap 7. The hinge connection is achieved by a groove 21 running transversely between the cover flap 7 and the handle lever 15, thereby providing a thin flexible connection between handle lever 15 and flap 7.

A spring 22 in the form of a wire spring is positioned between the handle lever 15 and the handle 4. The spring 22 is mounted on the inner surface of the handle lever 15 by means of pairs of pins 23, and two spring stops 24 and 25 located on the longitudinal axis of the handle lever 15. The spring urges the handle lever 15 upwardly away from the handle 4. Accordingly that end of the handle lever 15 connected to the cover flap 7 urges the broader end of the cover flap upwardly. In consequence the cover flap 7 is rotationally urged into the spout covering position.

In order to uncover the spout, the handle 4 and handle lever 15 are simultaneously grasped and squeezed together thereby moving the handle lever 15 against the spring 22 into the handle 4. As a result, the end of the handle lever 15 connected to the cover flap 7 is moved downwardly. Because of the hinged connection between the cover flap 7 and the handle lever 15, the broad end of the cover flap is also moved downwardly thereby pivoting the cover flap to raise the narrow end thereof and uncover the pouring spout 3.

As already indicated the handle lever and the cover flap are integrally formed from plastics material such as polypropylene.

If desired the cover flap 7 may include a whistle 26 so that the user of water kettle is informed when the water within the kettle is boiled. Preferably the whistle is a variable intensity whistle of the type disclosed in our co-pending U.S. Pat. application No. 830,813.

A major advantage of the preferred embodiment of the present invention is that the kettle 1, the handle 4, the handle lever 15 and cover flap 7 may all be made from plastics material.

Accordingly the pivotal mount for the handle lever 15 and the hinge mounts for the cover flap 7 may be moulded as a unitary structure, and the snap-in locking action permits easy assembling of the cover spout assembly. The foregoing spout cover assembly is of low cost in material and labour compared with arrangements used hitherto.

The foregoing describes only one embodiment of the present invention and modifications, obvious to those skilled in the art, may be made thereto without departing from the scope of the present invention.

I claim:

1. A manually operable spout cover assembly for the pouring spout of a container having a handle positioned above said container, said assembly comprising a cover flap shaped substantially to correspond with the opening of said spout, hinge means connecting said cover flap with said container to form a fulcrum for said cover flap to permit movement of said flap between a spout covering position and a spout pouring position; a handle lever pivotally mounted with one end on said handle, the other end of said lever being hingedly connected to one end of said cover flap, said lever and cover flap being integrally formed from plastics material; and resilient means interposed between said handle and said lever to urge said other end of said lever away from said handle to move said cover flap into said spout covering position.

2. A manually operable spout cover assembly as claimed in claim 1 wherein said hinged connection between said one end of the cover flap and the handle lever integrally formed therewith is achieved by a groove running transversely therebetween thus providing a thin flexible piece of plastics material.

3. A manually operable spout cover assembly as claimed in claim 1 wherein said plastics material is polypropylene.

4. A manually operable spout cover assembly as claimed in claim 1 wherein said fulcrum comprises a ledge extending transversely on said cover flap and normal thereto at a predetermined distance from the connection between said cover flap and said handle lever, said ledge having a groove running along the joint between said ledge and said cover flap to provide a thin flexible piece of plastics material which acts as a hinge.

5. A manually operable spout cover assembly as claimed in claim 4 wherein said ledge has two mounting lugs and said container has a grooved ridge extending transversely across one side of the spout opening and has two slots in the bottom of said groove, said mounting lugs being adapted to fit into slots with a tight fit.

6. In a water kettle having a spout opening and a cover flap therefor, and having a handle of substantially U-shaped cross-section positioned above said kettle, the improvements comprising a handle lever of plastics material of substantially inverted U cross-section fitting into said handle, said lever having a partition near one end, said partition having a bead at its free edge, a pair of lugs in the handle near its rear end, said lugs having recesses for pivotal engagement by said bead, the other end of said lever being linked to said cover flap and being integrally formed therewith, a first transverse groove being provided at the junction between said lever and said flap to form a hinge of thin plastics material, a ledge extending transversely and normal to said cover flap at a predetermined distance from said first transverse groove, a second transverse groove running along the joint between said cover flap and said ledge to provide a hinge between said ledge and said cover flap, a grooved ridge extending transversely across one side of the spout opening adapted to receive said ledge and a wire spring interposed between said handle lever and said handle to force the lever and the handle apart, said handle lever having pairs of pins and stop members on its inner surface to hold said spring in position.

7. The improvements as claimed in claim 6 wherein said ledge has two lugs and said grooved ridge has two corresponding slots in the bottom of said ridge for securing said ledge in said ridge.

8. The improvements as claimed in claim 6 wherein the plastics material is polypropylene.

* * * * *